Sheet 1-3 Sheets.

A.C. Gallahue.
Pegging Mach.

No. 3533.

Reissued Jul. 6. 1869.

Sheet 2 - 3 Sheets.

A. C. Callahue.
Pegging Mach.

No. 3533.

Reissued Jul. 6. 1869.

Sheet 3 - 3 Sheets.

A. C. Callahue.

Pegging Mach.

No. 3533

Reissued Jul. 6. 1869.

UNITED STATES PATENT OFFICE.

ALPHEUS C. GALLAHUE, OF RIVERDALE, NEW YORK.

IMPROVED MACHINE POR PEGGING BOOTS AND SHOES.

Specification forming part of Letters Patent No. 9,947, dated August 16, 1853; antedated February 18, 1853; extended seven years; reissue No. 3,533, dated July 6, 1869.

*To all whom it may concern:*

Be it known that I, ALPHEUS C. GALLAHUE, formerly of Allegheny City, Pennsylvania, now of Riverdale, in the county of Westchester and State of New York, have invented certain new and useful Improvements in Machines for Pegging Boots and Shoes; and I do hereby declare that the following is a full, clear, and exact description thereof, reference being had to the accompanying drawings making part of this specification, and to the letters of reference marked thereon—like letters indicating like parts wherever they occur.

To enable others skilled in the art to construct and use my invention, I will proceed to describe it.

Figure 1:
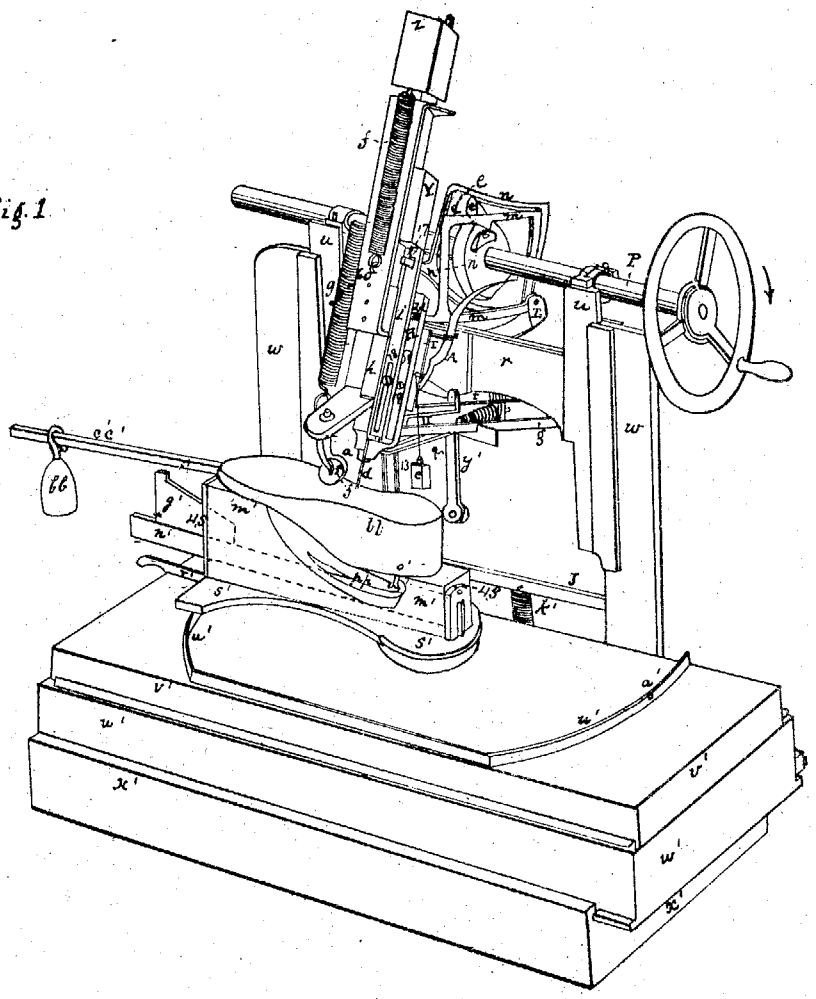
Figure 2:
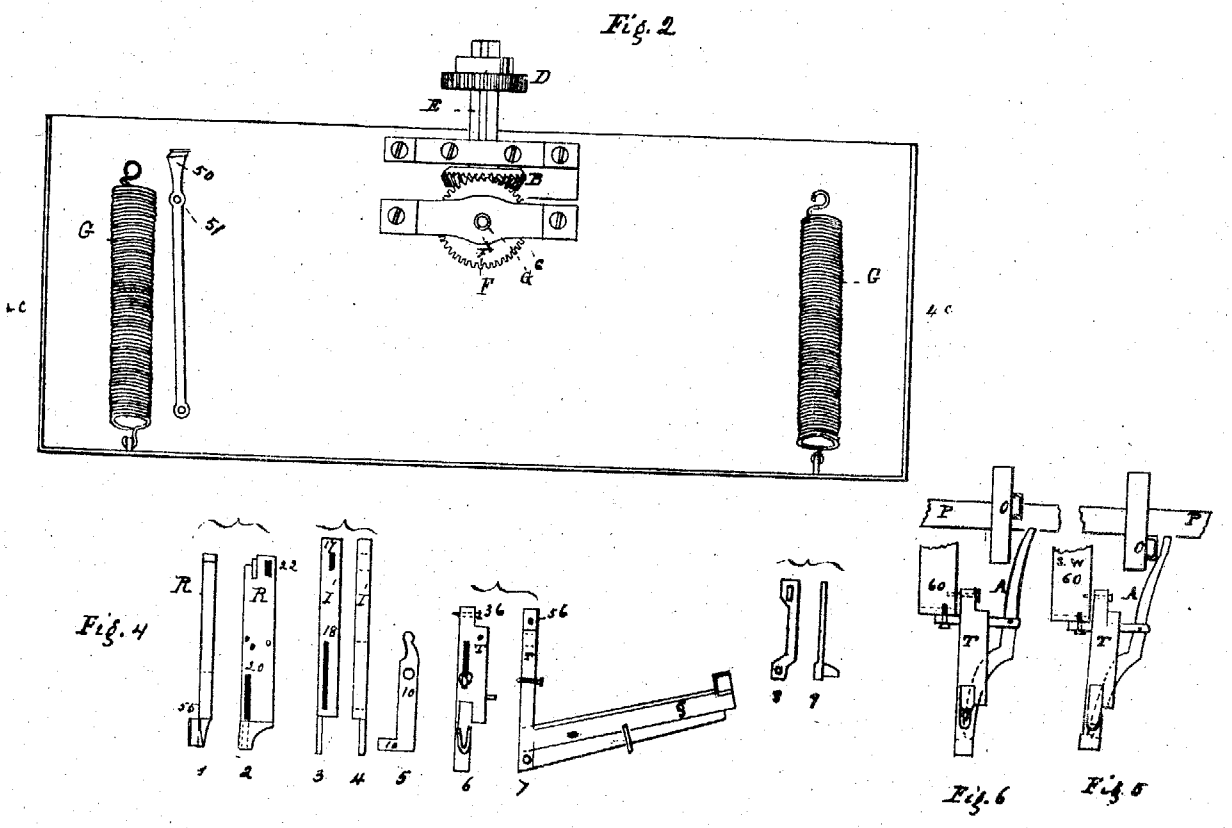
Figure 3:
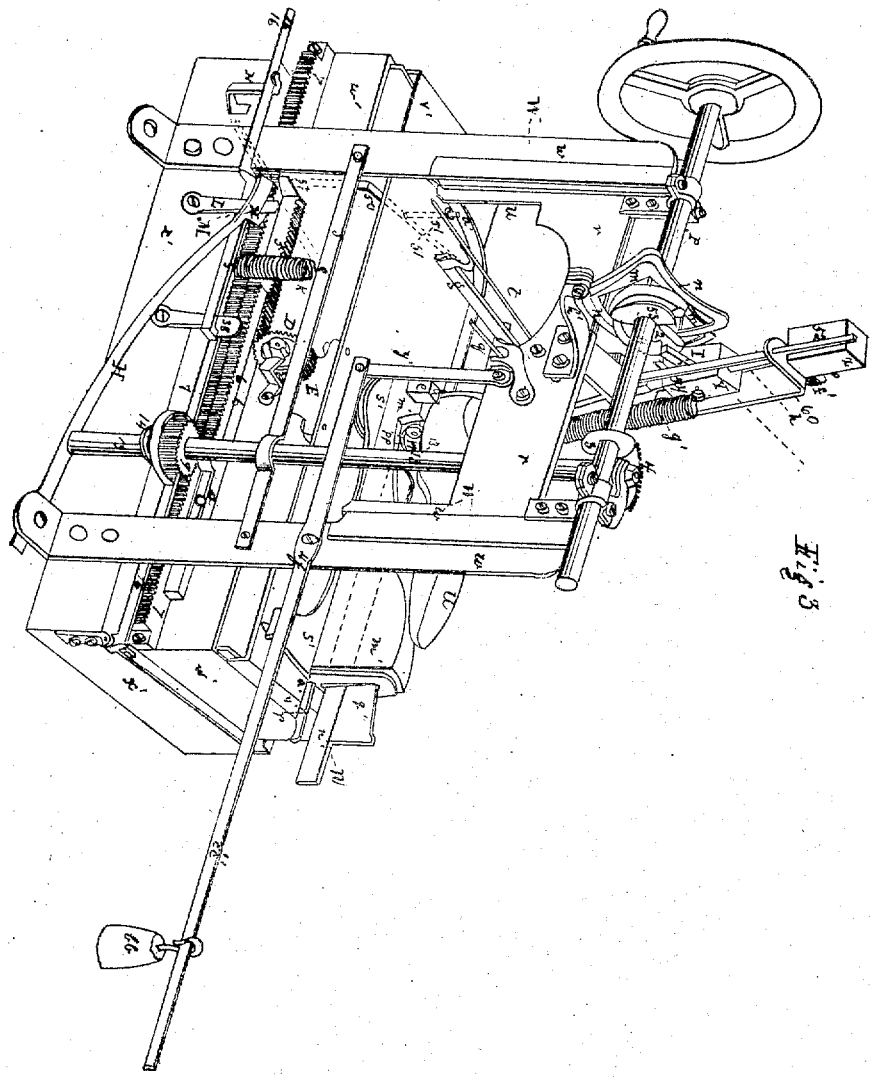

Figure 1 is a perspective front view. Fig. 2 is a bird's-eye view of the table reversed. Fig. 3 is a perspective view as seen from the back; Fig. 4, sectional drawings.

The nature of my invention consists in so constructing a machine that the punching of holes, cutting pegs, and driving them by percussion (not forcing) into the soles of boots or shoes, is performed at one operation; and that instead of moving the machine over and around the work, which is attended with great complexity of machinery and expense, I am enabled to move my work under the operative portions of the machine, and, by simplifying the mechanism, greatly reduce the cost, and render practical the operation as applied to all sizes and shapes of the sole, without any change being necessary, except that of substituting one of the ordinary lasts for another.

In Figs. 1 and 3, *l l* represent the last of the ordinary form. It is provided with a staple, $o^1$, for securing it on the block *m′ m′*, and at one end of this block there is a slight hollow to receive the toe, while the other end is flat to receive the heel of the last. *s′ s′*, a metallic plate, having uprights $4^s$ $4^s$, between which the block *m′ m′* is placed, it being secured by screws to *s′ s′*. This plate forms a turn-table for the last, the pivot thereof being a shaft, *c*, Fig. 2, under the center of the heel, by which the ends of the shafts are reversed. The last is secured to the block and turn-table *s′* by a lever, *n′*, passing entirely through *m′ m′*, and through slots in $4^s$ $4^s$, and having a hook for entering the staple O′ in the last. By the driving of a wedge, *q′*, in the slot $4^s$, the lever is depressed, and, drawing on the hook and staple, secure the last firmly on *m′ m′*. *x′ x′* is the base of the machine. *w′*, a sliding table thereon, moving longitudinally, by tongues and grooves, through the agency of racks and a pinion. *v′*, a second table, vibrating back and forth on *w*. *u′* is a rail supporting the turn-table *s′* and toe of the last. At each end portion of the rail is a square notch or stop, *a′*, in which the spring-handle *r* of the turn-table drops on the alternate change in the position of the last in pegging each side. The straight portion of the rail on the edge of *o* supports the last-holder when the heel is being pegged. W W are uprights secured to the base *x′*, and are braced with a cross-tie, J. *u u*, sides of a sliding gate working in upright guides on *w*. *r*, Figs. 1 and 3, a cross-head connecting *u u*. P is the main or driving-shaft, secured horizontally on the upper end of gate *u*. On it is a screw, 3, Fig. 3; the screw thereof only partially extending, say, one-third of its circumference; the remaining portions at right angles to the shaft. It meshes into a cog-wheel, 4, on the upper end of shaft 13, giving it motion only when the screw portion is in contact, although the right-angled part is always in mesh. This shaft is suspended by a nut, resting on the upper side of a bent arm, bolted on the top of the upright *w*. On the lower portion of shaft 13 slides a pinion, 9, which has motion given to it by a sliding key and slot in the shaft and pinion. This pinion engages in rack 7, and also in rack 6, when drawn up by the lever 16, by the helical spring *k′*, which changes the gear of the pinion in giving the table *w′* motion toward the right. After finishing the shoe the table is returned by hand.

The slight transverse motion of the table *o*, required on account of the inequality of width of the soles, is permitted by the extension and contraction of helical springs G G, (see Fig. 2,) placed under *v′*, one end thereof being secured to the side of *v′*, the other end to the side of *w′*. By means of these springs the edge of the sole is always kept up to the gage *a*, Fig. 1, back of the awl *d*, under the peg-driver. This gage *a* is made adjustable, so that by changing it any desired number of rows can be pegged around the shoe, one after another. By a pinion, D, Figs. 2 and 3, placed on a horizontal shaft, E, which carries a bevel-wheel, B, meshing in a second bevel-wheel, F, on the upright shaft *e*, motion is given the turn-table *s'*, placed on the upper end of this shaft, when required in turning the last in pegging the heel. A lever, *c' c'*, pivoted at $4^t$, and a pitman, *y'*, attached to *r*, and a weight, *b b*, as a counterpoise to adjust the weight of the sliding frame on the roller *f*, Fig. 1, pressing on the sole, serves as a means of giving greater or less pressure to this frame. Suspended from the cross-tie J, Fig. 3, is a helical spring, *k'*, connected with the lever 16, having its pivot at the end-table *x'*, which is drawn upward by the spring lifting the pinion 9. This lever 16 is held down by a catch, $3^s$, until it is relieved by the short projecting arm $3^t$, projecting from the rack 5, striking against the catch $3^s$, when the spring *k'* lifts the lever 16, and pinion from rack 7 to rack 6. H is a flat spring secured to the base *x'*, the upper end thereof resting on the shoulder of another catch, L. The pinion being now engaged with the rack which slides by means of a slot therein on a screw, *z'*, projecting from the table *w'*, carries with it the rack 5, and thus gives motion to the turn-table *s'*, by the pinion D, as above described. The same arm $3^t$ now is moved against the catch L, and throws it from under spring H, which depresses lever 16, and throws the pinion out of rack 6 into rack 7. N, Fig. 3, is a trip-lever, secured to the front of the base *x'*, and acts on the spring 50 and lever 51, placed under the spring-handle *r'*, throwing said spring-handle out of the stop *a'*, when the lever 16 is lifted by the helical spring *k'*, and thus permits the turn-table to change the position of the last while the pegs are being inserted in the heel after one side is finished; then the pinion 9, in gear with rack 7, continues moving the table *w'* and the last still farther to the right, and finishes the shoe. The pegging portion is represented by *h*, a rod in Fig. 3; the lower end carries the awl *d*, and the upper end the head *z*. *f'* is a helical spring attached to the head, giving the awl-rod a quick stroke when released from the cam 53, Fig. 3, the arm having been lifted by an arm, 54, projecting from the square rod 52, also connected with *z*. This cam also holds up the rod and awl, while the peg is being inserted. The spring *f'* has its lower end secured by a staple to the ways 60, in which there is a series of holes for adjusting the staple up or down, as shown in Fig. 1, and thus to regulate the tension of the spring, so as to strike a heavier or lighter blow, as may be required. Y, a square hammer-head, sliding independent of the peg-driver, on the awl-rod *h*, said rod moving in stationary ways 60. Its use is to drive the pegs into the sole, and is lifted by the end of cam 2, acting on a projecting arm, 1, being held up by this cam, (a portion seen in dot lines,) while the awl is in operation. *g'*, a helical spring, giving a quick descending motion to the hammer. *i*, Fig. 1, (also in Fig. 4, sectional drawings,) Figs. 1 and 2, is the rod of the peg-driver, lifted by a stirrup, *n*, (connected at 17,) and by the cam *e* on the main shaft P. It slides on the face of the peg-cutter R by means of a slot, 18, and screw. The lower part of *i* is rounded and reduced in size, (see Fig. 4,) of which 3 is the front and 4 the side view, so as to enter freely the tube 55. In R, (see Fig. 4,) of which 1 is the side and 2 the front view, the peg-wood passes through slot 20, and stops against a spring-gage plate, 10. A knife, represented by the angular piece at 55 of 1, in Fig. 4, is drawn upward, and the knife at 55 splits the peg with the grain of the wood by the stirrup *m*, connected at 22, raising R, and forcing upward the wood against a stop pressing into a slot, 20, arrests it, and the peg is forced into the tube. This stop is adjustable, by a slot in 8, to suit different lengths of peg-wood. It is represented by 8, the front, and 9, the side, view. (See Fig. 4.) T, Fig. 4, the base-block, upon which all the sliding portions are secured. It is swung to the frame-work by a screw, 56, at its upper end, so as to admit of a slight change of position, to bring the peg over the previously-punched hole in the sole, by means of the lever A, afterward described, Figs. 5 and 6, acted on by the side cam *o* in its revolution. *g*, the trough carrying the peg-wood, connected with the base T. I I, the finger forcing up the peg-wood in *g* by the weight *e* and cord passing over the stub on the side of T. L, a bent arm, on which the stirrups *m* and *n* are pivoted.

The operation is as follows: The last being turned toward the wheel and handle on shaft P, the toe thereof toward the right hand, the edge of the sole bearing against the gage *a*, and the drop-bar *r'*, in *a'*, under the toe, the peg-wood, supplied in strips in the holder *g*, turn the shaft P toward the right, or in direction of dart. The cam 53 raises the hammer *z*, and rod 52, by a projecting arm, 54, thereon, and the awl-rod *h*, sliding in ways 60, and awl *d*, on the arm 54, being released from the cam, the spring *f'* quickens the descent of the awl, and drives it into the sole of the shoe. Then the cam *e*, through the stirrup *n*, lifts the peg-driver I sufficient to let the peg-wood under it against the gage 10, and the cam *o*, Fig. 3, the peg-cutter, and the cam 2 lifts the arm 1 of the sliding hammer Y, keeping it up until the awl is raised out of the way by the cam 53 again coming in play, and both hammers are kept up until the upper end of the lever A being moved to the right, in the revolution of the wheel carrying the cam *o*, (see Fig. 5 where this change of position is shown,) while the lower end of A, entering a hole in the lower end of the base-block T, carrying the peg-tube and driver, gives it and them a slight side movement, independent of the awl and awl-rod, for the purpose of bringing the charged tube and driver over the previously-punched hole in the sole.

Fig. 6 shows the position of T in detail, as seen in Fig. 1.

By the turning of cam 2, the arm 1 is released therefrom, and permits the head Y sliding on the awl-rod *h*, moving in fixed ways of the frame 60, to give a quick descending stroke on the head of the peg-driver, and thus insure the perfect insertion of each peg successively into the sole of the shoe.

It is obvious that, instead of using the hammer to operate the peg-driver, and attaching the spring *g'* to that, the spring may be applied direct to the peg-driver, the same as is done with the awl-carrier, either plan being used at will.

By this method of constructing a machine, many advantages are gained over the machines heretofore made.

In all machines of this class, as previously constructed, the shoe or boot, when being pegged, was simply moved forward in a straight line, and instead of gaging the row of pegs, by having the edge of the sole bearing against a gage, as I do, they had to use patterns corresponding in size and form to the boot or shoe being pegged, to gage and form the rows, and at every change in the size or form of the boot or shoe the patterns had to be changed also.

By my plan the sole itself becomes the pattern, and thus my machine, without any change or alteration, will peg a boot or shoe of any size or form, and by simply adjusting the gage so as to throw the last farther in or out successive rows may be formed in the same manner.

In the previously-made machines, where the shoe simply moved to and fro, they could only peg along the sides, leaving a space around both heel and toe unpegged, and which had afterward to be finished by hand.

By my plan of pivoting the last-holder so that it can be turned around, I am enabled to continue the pegging entirely around the heel, starting at the toe on one side, and continuing around to the toe on the opposite side, thus completing at one operation the entire pegging, with the exception of a small space at the toe, where it is usual to insert nails.

By using a spring and attaching it directly to the awl-carrier, or to the weight attached rigidly thereto, (if a weight be used,) I drive the awl by a quick percussive movement, and then by using a cam to withdraw the awl, I make sure of overcoming any tendency of the awl to stick in the sole.

I rely on the spring for driving the awl, and it is obvious that the spring may be used for this purpose with or without a weight, as may be desired; and by regulating or altering the tension of the spring, the force of the blow can be adjusted to adapt the machine to making boots and shoes of any style, with soles light or heavy, thick or thin.

I am aware that machines have heretofore been made in which a cam was used to force the awl and the peg into the sole, and a spring used to withdraw the awl; and therefore I do not claim, broadly, the use of a spring or cam in a pegging-machine; but having thus described my invention,

What I claim is—

1. The use, in a pegging-machine, of a gage, arranged in relation to the part that supports the boot or shoe, to form a bearing for the edge of the sole, and thus insure the insertion of the pegs at a uniform distance from the edge of the sole, without the use of patterns, substantially as described.

2. Adjusting the tension of the spring that operates the awl-carrier or peg-driver, substantially as described, for the purpose of regulating the force of the blow, as may be desired.

3. The combination of the awl-carrier and the peg-driver, each separately lifted by a cam and driven down by a spring, substantially as described.

4. The combination, in a pegging-machine, of a gage for the edge of the sole to rest against, and an awl-carrier, driven by a spring, substantially as herein described.

5. Making the gage *a*, against which the edge of the sole bears, adjustable, for the purpose of enabling the shoe to be so adjusted as to have two or more rows of pegs inserted therein.

6. Also, the combination, in a pegging-machine, of a gage for the edge of the sole to bear against, and a rotating last-holder or support, substantially as described.

ALPHEUS C. GALLAHUE.

Witnesses:

W. C. DODGE,

J. MCKENNEY.